(12) United States Patent
Powers

(10) Patent No.: US 12,041,946 B2
(45) Date of Patent: Jul. 23, 2024

(54) COLD BREWED COFFEE SYSTEM

(71) Applicant: John Powers, Watertown, MA (US)

(72) Inventor: John Powers, Watertown, MA (US)

( * ) Notice: Subject to any disclaimer, the term of this patent is extended or adjusted under 35 U.S.C. 154(b) by 1 day.

(21) Appl. No.: 17/661,772

(22) Filed: May 3, 2022

(65) Prior Publication Data

US 2023/0354842 A1 Nov. 9, 2023

(51) Int. Cl.
*A23F 5/26* (2006.01)
*A47J 31/44* (2006.01)
*A47J 31/46* (2006.01)

(52) U.S. Cl.
CPC ............... *A23F 5/26* (2013.01); *A47J 31/446* (2013.01); *A47J 31/467* (2013.01)

(58) Field of Classification Search
CPC ...... A47J 31/005; A47J 31/446; A47J 31/467; A23F 5/26
See application file for complete search history.

(56) References Cited

U.S. PATENT DOCUMENTS

| | | | |
|---|---|---|---|
| 2,263,610 A | 11/1941 | Cain | |
| 4,116,212 A | 9/1978 | Cooper | |
| 4,215,717 A | 8/1980 | Trosch | |
| 4,473,094 A | 9/1984 | Harris | |
| 4,575,330 A | 3/1986 | Hull | |
| 4,605,175 A | 8/1986 | Weber | |
| 4,701,333 A | 10/1987 | Margolis et al. | |
| 4,796,795 A | 1/1989 | Urban | |
| 4,969,392 A | 11/1990 | Steele et al. | |
| 5,028,753 A | 7/1991 | Shariat | |
| 5,182,056 A | 1/1993 | Spence | |
| 5,390,698 A | 2/1995 | Frazzini | |
| 6,053,194 A | 4/2000 | Nelson et al. | |
| 7,858,133 B2 | 12/2010 | Neace, Jr. et al. | |
| 8,720,321 B2 | 5/2014 | Neace, Jr. et al. | |
| 9,993,011 B2 | 6/2018 | Feber | |
| 10,517,421 B2 | 12/2019 | Habram | |
| 10,575,672 B2 | 3/2020 | Rivera | |
| 11,167,976 B2 | 11/2021 | Lin | |
| 11,284,740 B2 | 3/2022 | Buerger | |
| 2018/0263403 A1* | 9/2018 | Richardson | A47J 31/005 |
| 2020/0268196 A1* | 8/2020 | Granzeier | A47J 31/38 |
| 2021/0267410 A1* | 9/2021 | Buerger | A47J 31/002 |

* cited by examiner

*Primary Examiner* — Drew E Becker
*Assistant Examiner* — Chaim A Smith
(74) *Attorney, Agent, or Firm* — Edison Law Group

(57) ABSTRACT

An improved system for cold-brewing coffee is disclosed. The system includes a first container for containing and steeping ground coffee beans in water and a second container for collecting coffee bean extract. The improvement comprises a closure, a pump, a sleeve, and a tube. The closure includes a first housing configured to removably secure the first container to the first housing and a second housing configured to removably secure the second container to the second housing. The pump has an inlet and an outlet. The sleeve, unitary with the first housing, defines an interior region into which the pump is received and an exterior surface extension in fluid communication with the pump outlet. The tube has opposite end portions. One of the end portions of the tube is removably secured to the sleeve exterior surface extension. The first and second housings are removably joined together.

7 Claims, 7 Drawing Sheets

COLD BREWED COFFEE SYSTEM

FIELD

The present subject matter is directed, in general, to systems that cold brew coffee and, more particularly, to cold-brewing systems connecting two containers, for causing the cold-brewed coffee to be filtered from one container into the other.

BACKGROUND

While systems for cold-brewing coffee offer consumers many advantages, known systems for cold-brewing coffee are problematic; and so, I undertook a prior art search, to investigate if state-of-the-art US patents address problems I solved.

U.S. Pat. No. 2,263,610 to Cain is directed to an apparatus for cold brewing coffee. The apparatus comprises three containers and two filtration components. A first or top container contains water and has a lower portion providing an opening sized for receiving an inlet of a first filtration component. A second or middle container, for containing coffee grounds, includes an upper portion having an inlet or opening configured to receive an outlet of the first filtration component. The first filtration component includes a disc below the coffee grounds. A third or lower container, sized and configured to contain coffee extract produced, includes an upper portion having an opening. The middle container, internally configured to support a second filtration component, includes a lower portion having an outlet insertable into the lower container opening. The first filtration component can contain activated carbon. The second filtration component is configured for supporting the coffee grounds. The disc has a central opening to enable cold water trickling through the first filtration component to drip onto and pass through the coffee grounds, to produce cold-brewed coffee extract within the lower container.

U.S. Pat. Nos. 7,858,133 and 8,720,321 both to Neace, Jr. et al. are directed to an hourglass-shaped apparatus to cold brew coffee, comprising a brew chamber, an extract chamber, and a center piece connecting the brew and extract chambers. The brew and extract chambers comprise ends of the hourglass-shaped apparatus. The center piece has a middle portion. The brew chamber houses a freestanding, self-contained filter assembly containing coffee grounds inside a micro-fine wire mesh. Water is poured into the brew chamber to generate coffee extract through cold-water infusion. After the grounds brew, the apparatus is inverted, and coffee extract travels into the extract chamber through the center piece, for dispensing.

U.S. Pat. No. 9,993,011 to Feber discloses a cold brewed coffee assembly featuring a closure having a first side and a second side opposite the first side. The first side of the closure has a first coupling member configured to couple the closure to a first container. The second side has a second coupling member for coupling the closure to a second container. A filter is between the first and second coupling members. A support member, supporting the filter, is said to define an air channel extending through the support member and across the filter. A tube, sized and configured to be connected to the support member, extends from the first side of the closure to a bottom of the first container when the first container is coupled to the first side of the closure. The tube is said to further define the air channel.

U.S. Pat. No. 10,517,421 to Habram is directed to a brewing system comprising a carafe assembly. The carafe assembly comprises a container configured and sized to contain coffee that is brewed. The carafe assembly includes a brewing assembly configured to be selectively connected to the carafe assembly container to brew coffee and thereafter selectively removed from the container when serving brewed coffee. The brewing assembly also includes a mesh filter assembly configured to allow for separation of the coffee grounds from the brewed coffee, and an agitation mechanism to agitate coffee grounds and coffee while the coffee is being brewed. The brewing assembly further includes a heating assembly to support the carafe assembly and add heat thereto. Agitation is via movement of a paddle component.

U.S. Pat. No. 10,575,672 to Rivera is directed to a cold-brewing device said to reduce the amount of time otherwise required to produce cold-brewed coffee. The cold brewer includes a container, which is said to be preferably transparent. The cold brewer also includes an elongated brewing material holder suspended from a lid of the container. The brewing material holder is enclosed in mesh to retain the brewing material within the brewing material holder. In an embodiment, a mesh is a nylon 75-micron opening mesh. The lid includes a mechanism to rotate the brewing material holder. The container is filled with water and the brewing material holder is filled with brewing material. Movement of the brewing material submerged in water is said to reduce the amount of time needed for cold brewing.

U.S. Pat. No. 11,167,976 to Lin is directed to a cold brew coffee extraction device comprising a container having a first chamber for receiving cold water. A filtering cup, mounted in the first chamber, includes a second chamber which communicates with the first chamber. The second chamber, configured to receive coffee powder, includes an opening. The filtering cup includes an opening at a lower end thereof for receiving a filter. A first guiding tube includes a first end which communicates with the second chamber and a second end located outside the container. A pump, disposed outside of the container, is connected to the second end of the first guiding tube. A controller, operatively connected to the pump for controlling operation of the pump, supplies air to or draws air from the first guiding tube, for maintaining a predetermined level of cold water within the first chamber.

U.S. Pat. No. 11,284,740 to Buerger is directed to a cold brew system for preparing cold brew coffee by extraction of coffee grounds with brew water in a single-pass, non-immersion extraction operation that uses a tower unit having first and second receiving locations to receive a pre-infusion container for preparation of a pre-infusion mixture of coffee grounds during a pre-infusion operation and to receive an extraction vessel containing the transferred pre-infusion mixture for extraction-processing, to prepare a cold-brewed coffee product which is collected in a collection container received in the second receiving location of the tower unit. A brew control system controls operation of a water dispensing system during a cold brewing process cycle and includes a controller unit having stored within its memory multiple profiles for a variety of different cold-brew coffee products which could be prepared at the direction of the controller unit. A network may include several such cold brew coffee brewing systems connected with a central server.

The present subject matter—my invention—provides several advantages over subject matter disclosed in U.S. Pat. No. 2,263,610 to Cain; U.S. Pat. Nos. 7,858,133 and 8,720, 321 both to Neace, Jr. et al.; U.S. Pat. No. 10,517,421 to Habram; U.S. Pat. No. 10,575,672 to Rivera; U.S. Pat. No. 11,167,976 to Lin; and U.S. Pat. No. 11,284,740 to Buerger. Indeed, it is expected that many advantages of the present subject matter over subject matter disclosed in the prior art US patents briefly summarized above will become clear to those of ordinary skill in the field of the present subject matter after reviewing the present patent specification and its associated drawing figures.

Because the cold brewed system disclosed in U.S. Pat. No. 9,993,011 to Feber includes certain inherent disadvantages, I would now like to address additional advantages of the present subject matter over disclosure found in the '011 patent.

PRIOR ART U.S. Pat. No. 9,993,011 to Feber discloses (FIG. 1), a cold brew coffee filtration assembly 10 including a closure 20 configured to be connected to a first container 110 and a second container 120 to produce coffee concentrate from steeping coffee grounds in water. Coffee grounds and water are loaded through an opening 116 defined at a top 112 of the first container 110. The top 112 is opposite a bottom 114. After steeping coffee grounds within the first container 110 for an extended period of time, such as about 12 hours or more, the assembly 10 is rotated 180 degrees to filter the coffee concentrate through a filter 60 of the closure 20. Because the filter 60 is sized to permit passage of coffee concentrate and restrict passage of coffee grounds therethrough, coffee concentrate passes to the second container 120, but coffee grounds do not pass to second container 120.

The closure 20 (FIG. 2) includes a first side 22 and a second side 24 located opposite the first side 22. The first side 22 includes a first coupling member 26. The second side 24 includes a second coupling member 28. (FIG. 1.) The first coupling member 26 (FIG. 2) can be configured to couple with first coupling member 118 (FIG. 1) of the first container 110, and the second coupling member 28 can be configured to couple with second coupling member 128 of second container 120.

The closure 20 further includes a support 40. The support 40 includes a support ring 42 and a plurality of support spokes 44 (FIG. 2) extending therefrom to a support hub 46. The support hub 46 can be located at an axial center of the support ring 42. The support hub 46 is said to define a center aperture 48 extending therethrough. The center aperture 48 is characterized as an air channel that is said to extend through the support 40. Extending from the support hub 46 at the first side 22 of the closure 20 is a support boss 50. The support boss 50 is aligned with the center aperture 48, both of which are said to further define the air channel.

The support 40 supports the filter 60. An air tube 70 is connected to the support boss 50. Alternatively, the air tube 70 could be integral with the support hub 46. The air tube 70 can be aligned with the center aperture 48 of the support 40 to further define the air channel, for providing a continuation of the air channel.

The air tube 70 extends through the opening 116 of the first container 110 towards, and nearly to the bottom 114 of first container 110. The second container 120 is coupled to the closure 20 at the second side 24 thereof. The second container 120 includes a top 122, a bottom 124 spaced opposite the top 122, an opening 126 defined at the top 122, and the second container coupling member 128 proximate to the top 122. The second container 120 is coupled to the second side 24 of the closure 20 through cooperation between threads of the second coupling member 28 and the second container coupling member 128. Coupling the first and second containers 110 and 120 to the closure 20 is said to result in a generally airtight seal between the first and the second containers 110 and 120, for preventing coffee concentrate and/or coffee grounds from leaking out from within the assembly 10.

In order for the cold-brewed coffee filtration assembly 10 that is disclosed in U.S. Pat. No. 9,993,011 to Feber to operate properly, the inventor claims that the tube 70, configured to be connected to the support member 40, must extend from the first side 22 of the closure 20 "proximate to"—which, in my dictionary, means "next or nearest in space" to—the bottom 114 of the first container 110 when the first container 110 is screwed onto the first side of the closure 20. In other words, if a container of a different height is substituted for the first container 110, the '011 patent requires using another tube 70 having a length that matches the height of a substituted container, if the '011 patent cold-brewed assembly is to operate at all.

SUMMARY

The present subject matter—my invention—is directed to an improved system for cold-brewing coffee. The system itself includes a first container for containing and steeping ground coffee beans in water and a second container for collecting coffee bean extract. My improvement comprises a closure, a pump, a sleeve, and a tube. The closure includes a first housing configured to removably secure the first container to the first housing and a second housing configured to removably secure the second container to the second housing. The pump, disposed within the closure, includes an inlet and an outlet. The sleeve is unitary with the first housing. The sleeve defines an interior region into which the pump is received and snuggly retained. The sleeve further defines an exterior surface extension in fluid communication with the pump outlet. The tube has opposite end portions. The first and second housings are removably joined together; and one of the end portions of the tube is removably secured to the sleeve exterior surface extension.

BRIEF DESCRIPTION OF THE FIGURES

Throughout the drawing figures and detailed description, I shall use similar reference numerals to refer to similar components of the present subject matter.

DETAILED DESCRIPTION

The present subject matter—my invention—is directed to a cold-brewed coffee system comprising a closure used for securely connecting two containers. While the closure provides a fluid-tight connection with respect to each container, each container is removable from the closure, for reasons discussed further below.

Two containers and the closure can be used to make cold-brewed coffee as follows. The closure would have appropriate structure at opposite ends to provide a removable yet secure connection with each container. While two containers can be identical in exterior shape and configuration, it is not necessary that they be so. Those of ordinary skill in the field of the present subject matter can easily envision an assortment of containers of various shape and configuration that would suffice.

Figure 1:
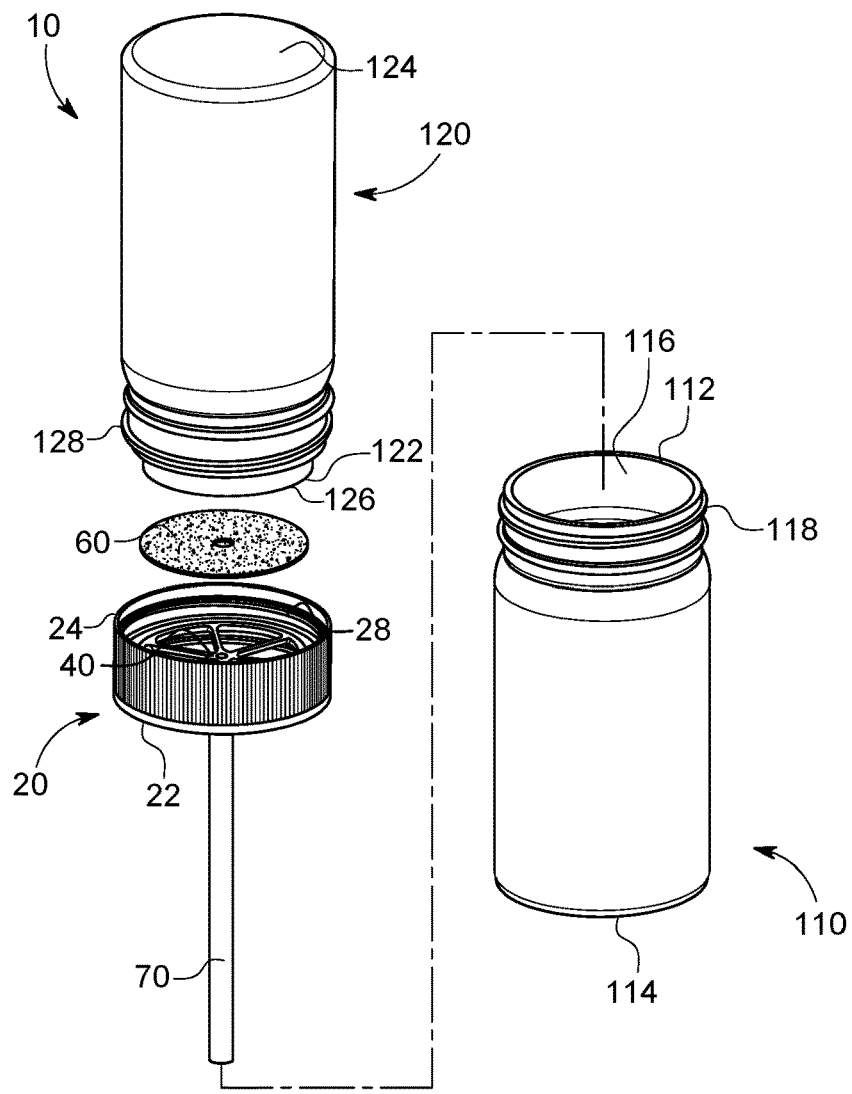
FIG. 1 is an exploded isometric view of a prior art cold brewed coffee system.
Figure 2:
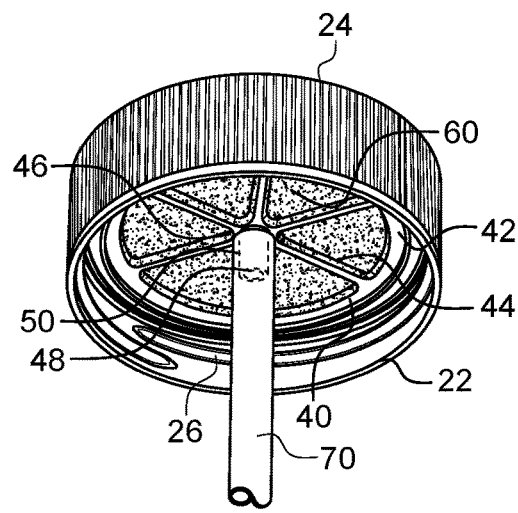
FIG. 2 is an underside view of a prior art closure component shown in FIG. 1.
Figure 3A:
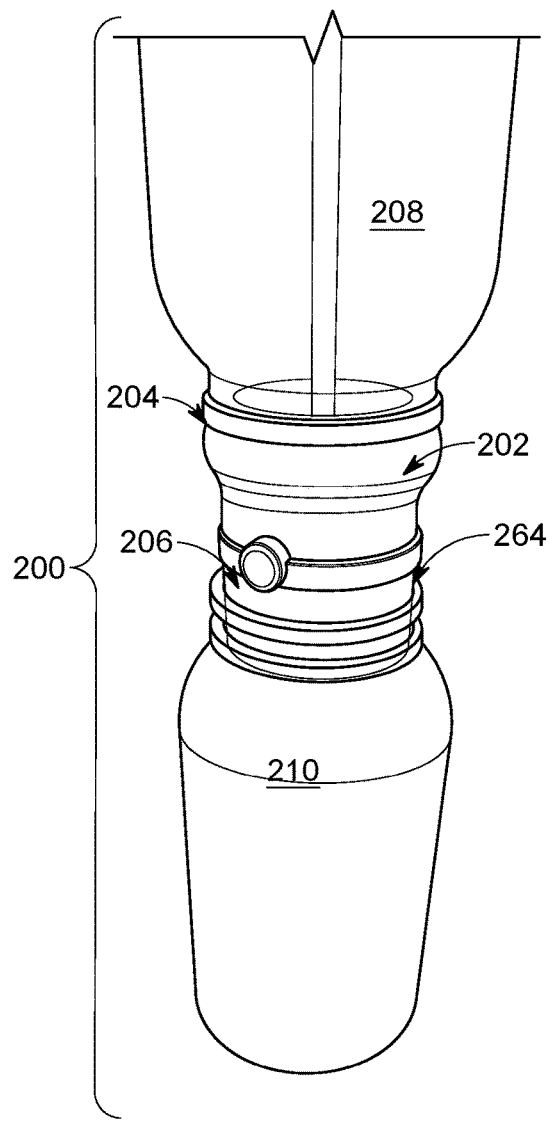
FIG. 3A depicts a closure of the present subject matter joined to containers.
Figure 3B:
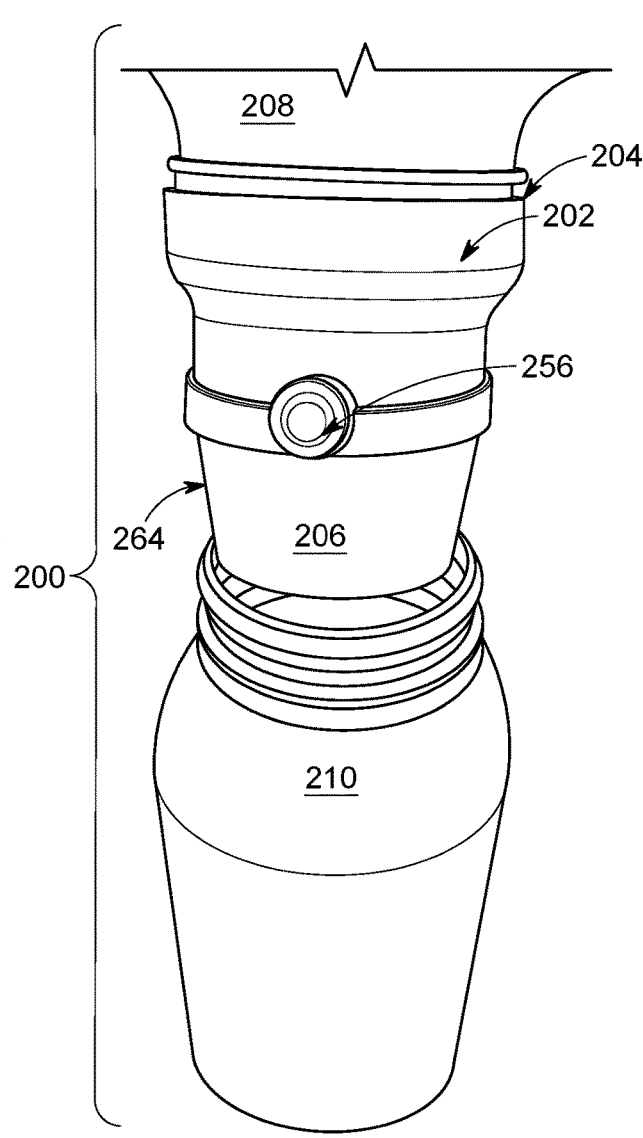
FIG. 3B depicts the closure spaced above the opening of the lower container.

While not necessary that the two containers have equal volume, it is recommended their volumes be equal, for reasons that will become clear after an illustrated embodiment of the present subject matter, FIGS. 3A and 3B, is discussed. To demonstrate a feature of the present subject matter, I have chosen to use a pair of well-known containers sold in a variety of stores. A cold-brewed coffee system 200 comprises a closure 202 having opposite end portions 204, 206 to which a matching pair of common glass jars 208, 210 is removably, yet securely attached.

The cold-brewed coffee system 200 depicted in FIG. 3A is oriented vertically, which is the orientation used for operation of the system 200. Before the upper or first glass jar or container 208 is secured to the closure 202, the first container 208 must be thoroughly cleaned to remove any residue remaining from any prior use.

Throughout this patent specification, my reference to "cold water" shall be understood to include water refrigerated to a temperature ranging from about 37 degrees Fahrenheit ("° F.") to about 41° F. as well as water held at room temperature, which ranges from about 68° F. to about 72° F. Thus, the term "cold water" shall be understood as water having a temperature ranging from about 37° F. to about 72° F.

Certain people may be familiar with coffee brewed using ground coffee beans having a particle size range of 0.6 to 1.5 millimeters ("mm") and water heated to a temperature of at least 100° C. (212° F.) See, e.g., U.S. Pat. No. 4,701,333 to Margolis et al. Certain other people may want to have coffee beans ground to a particle size range of 100 to 1,500 microns. See, e.g., U.S. Pat. No. 4,605,175 to Weber.

The present subject matter—my invention—enables a user to cold brew coffee beans ground to any particle size. The present subject matter also enables a user to prepare batches of cold brewed coffee to any concentration of coffee extract a user may desire. Also, throughout this patent specification, the term "fluid" shall be understood to relate to liquid (e.g., water) as well as gas (e.g., air).

To produce a batch of cold-brewed coffee, a thoroughly clean first or second container 208 or 210 could be used and would be placed on a surface S, such as a counter top (not shown), with the open end of the container 208 or 210 facing up. Into the open end of container 208 or 210 is added enough cold water to fill about 50% to 60% of the container (208 or 210) volume. Next, a predetermined weighted amount of coffee beans ground to any particle size satisfactory to the user is added. The amount added depends upon the concentration of coffee bean extract desired.

Figure 4:
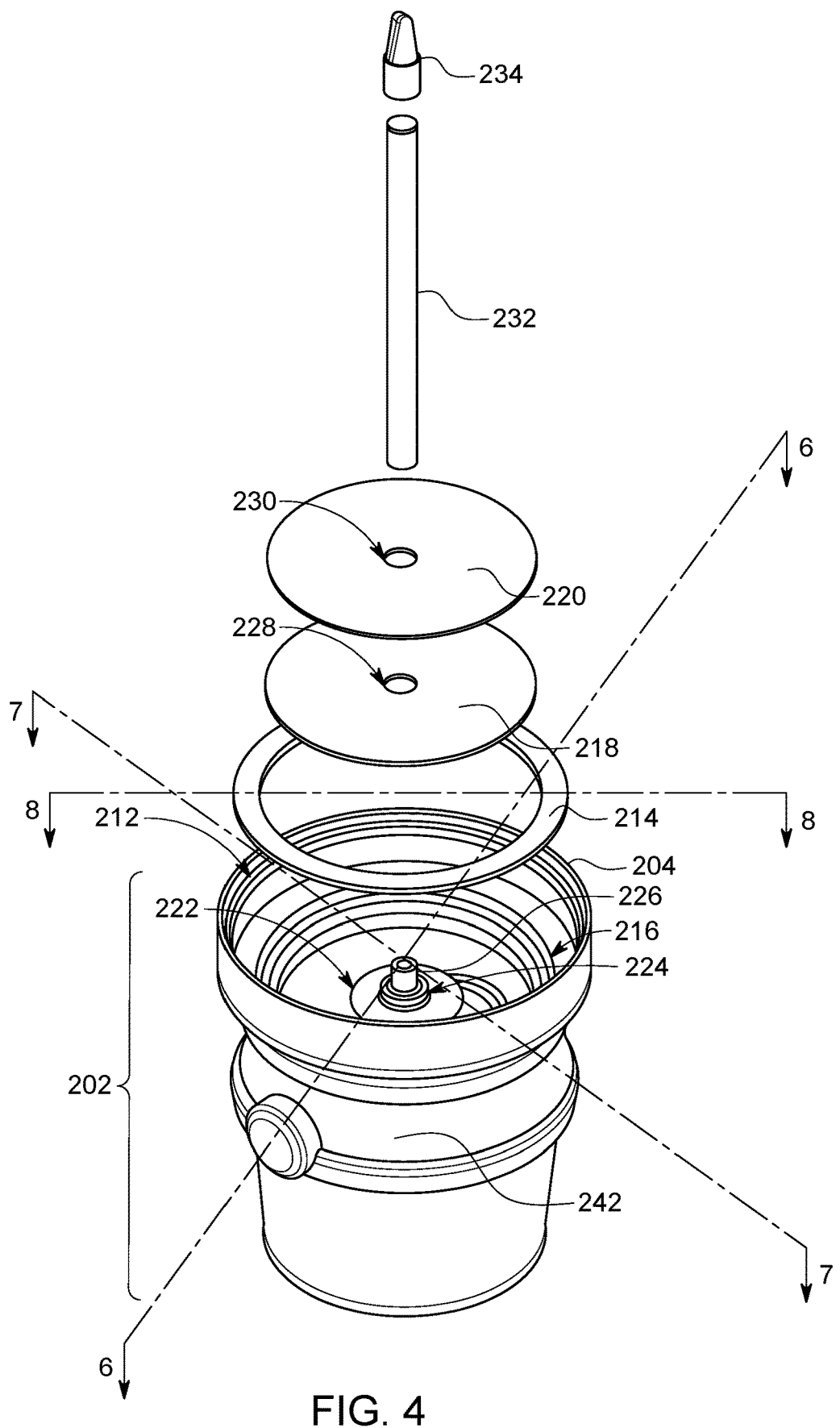
FIG. 4 is an exploded view of certain components associated with the closure.

After adding a desired weighted amount of ground coffee beans and stirring ground beans contained within an original amount of water, an additional amount of cold water is added to container (208 or 210) so it is about 90% to 95% full. The cold-brewing process of the present subject matter involves steeping the roasted coffee bean particles in cold water for a predetermined amount of time. In one embodiment of the present subject matter, the roasted coffee bean particles are steeped for 12-24 hours. In another embodiment, the roasted coffee bean particles are steeped for 8-36 hours. A user will determine a steep time providing a particular taste desired. After a cold-brewed batch of coffee has steeped for a desired amount of time, closure 202 (FIGS. 3A, 3B) is secured to container (208 or 210) containing the steeped batch of cold-brewed coffee—let us assume it is container 208—while container 208 is still oriented with its open end facing upwardly. In the illustrated embodiment presented in FIG. 4, an embodiment of closure 202 is shown along with embodiments of certain additional components of the present subject matter.

Because the illustrated embodiment of container 208 is a well-known glass jar having external threads surrounding its open-end portion, the end portion 204 (FIG. 3A) of closure 202 includes internal threads 212 (FIG. 4) that mesh with external threads of the well-known glass jar container 208 depicted in FIGS. 3A, 3B.

Figure 5A:
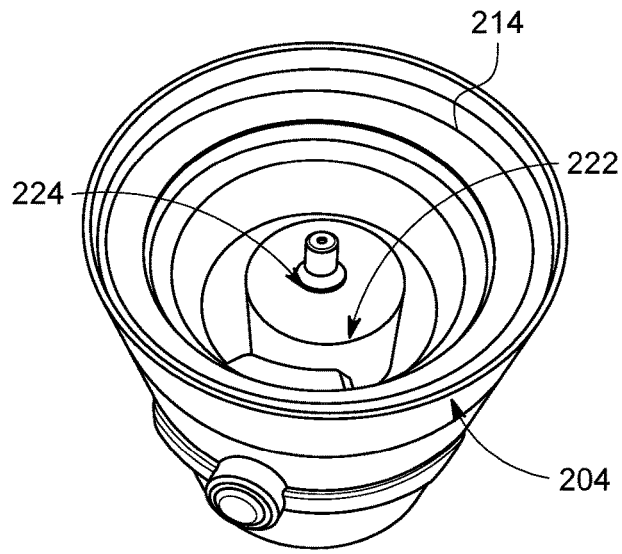
FIGS. 5A, 5B, 5C, and 5D are isometric views of the present subject matter, with FIGS. 5A through 5D depicting sequential addition of the closure components.

Additional components of the present subject matter include an annular gasket 214 (FIG. 5A), made of high-quality food-grade silicone, seated on an annular ridge 216. Ridge 216, in closure 202, is configured to horizontally orient gasket 214 relative to the opening of end portion 204 (FIG. 4), whenever the container 208 is securely connected to the closure 202, for providing a fluid-tight seal therebetween Coffee beans contain two natural oils: cafestol and kahweol. These oils, released from coffee beans when roasted, produce the spectrum of flavors and aromas brewed coffee has. Since relative amounts of natural oils depend on where beans were grown, certain global regions are preferred for the beans grown there.

These two natural oils, and other coffee "essences," are extracted from the ground coffee bean particles during the cold brewing process. If a user would like to prepare a relatively concentrated coffee bean extract, which the user will later dilute to taste, then a greater weighted amount of ground coffee beans would be added to the container (208 or 210). If the user would like to make a batch of coffee bean extract having a concentration, for producing brewed coffee to taste, "as is," a lesser weighted amount of ground coffee beans would be added to the container.

Figure 5B:
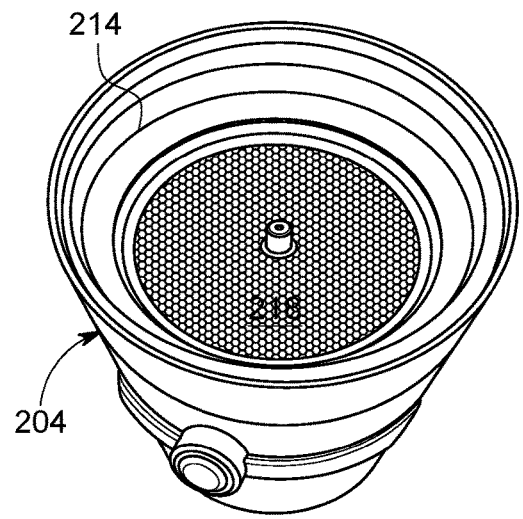
Figure 5C:
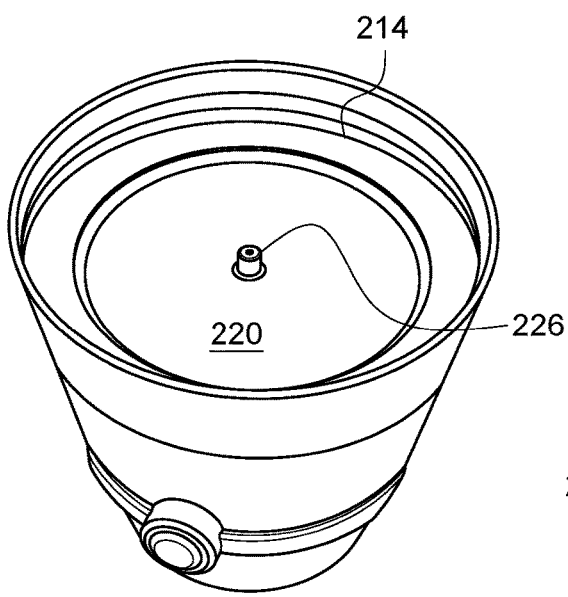

Additional components include a mesh screen 218, preferably made of stainless steel, and a filter 220 (FIG. 5C), supported by the screen 218 (FIG. 5B), for enabling a predetermined concentration of the natural coffee oils and other coffee "essences" to pass therethrough while trapping all the coffee grounds thereupon. Mesh configured to have predetermined openings and manufactured from an assortment of synthetic materials, including nylon and polyester, as well as various metallic materials, including stainless steel, can serve as filter materials, instead of paper, since the choice of a particular filter element a user selects will depend on a particular flavor, aroma, "essence," and/or "taste" of a cold-brewed coffee extract that a user seeks to produce. For example, the extract could be for a cake recipe, or a popular chocolate, or a "secret ingredient" of a popular beverage, and so forth.

In comparison, brewing with a paper filter produces clear, light-bodied coffee. While free of sediments, such as coffee grounds, paper-filtered cold-brewed coffee will lack many coffee oils and essences, trapped by most commercially available paper filters. Since mesh sizes of many commercially available metal and synthetic filters do not remove these coffee oils and essences, an assortment of coffee filter materials would be suitable for purposes of the present subject matter.

The gasket 214 (FIG. 4) provides a fluid-tight seal between the closure 202 and the container 208 whenever the open end of the container 208 is secured to the internally-threaded end portion 204 of closure 202 as shown in FIGS. 3A and 3B.

Figure 8:
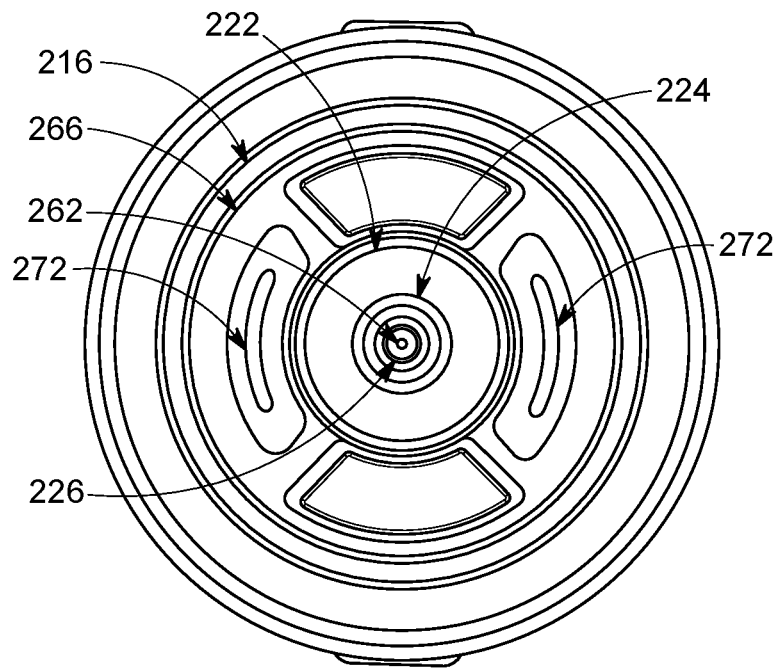
FIG. 8 is a view looking into the closure, taken from the plane 8-8 in FIG. 4.

An internally-located annular surface portion 222 (FIG. 4) of closure 202 includes a centrally-oriented annular platform 224 integral with surface portion 222 and surrounding an outlet 226 unitary with and extending from the platform 224. Mesh screen 218 includes a centrally-located aperture or opening 228. Similarly, the filter 220 includes a centrally-located aperture or opening 230. These outlets 228, 230 are sized and configured to surround the outlet 226. The screen 218 is supported by the centrally-oriented annular platform 224 (FIG. 4) and an annular ridge 266 (FIG. 8). Within the end portion 204 (FIG. 5A), annular ridge 216 (FIG. 8) supports the gasket 214 closer to the threads 212 (FIG. 4) than annular ridge 266 (FIG. 8) supporting the screen 218. The outlet 226 includes a central through bore.

Figure 5D:
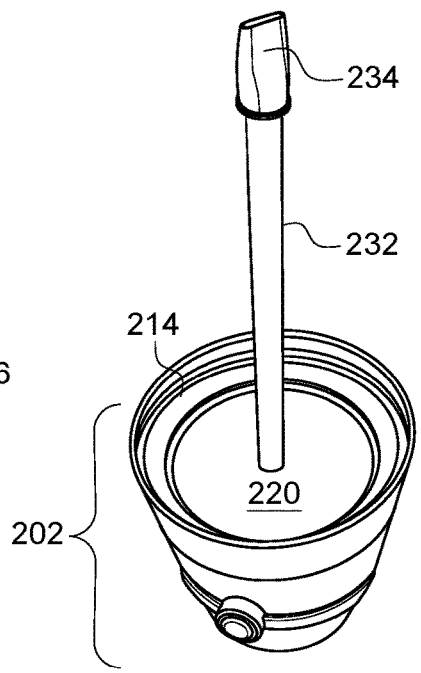

When operative, as shown in FIG. 5D, a tube 232 is connected to outlet 226. One end of tube 232, preferably made of silicone, has an internal diameter sized to snuggly receive outlet 226. In embodiments of the present subject matter shown in FIGS. 4 and 5D, the other end of the tube 232 is configured to be snuggly joined to a unidirectional fluid flow valve such as a duck bill valve 234 to control flow in one direction only. Unidirectional flow valves are well known components for purposes of the present subject matter. See, e.g., U.S. Pat. No. 4,116,212 to Cooper; U.S. Pat. No. 4,215,717 to Trösch; and U.S. Pat. No. 5,390,698 to Frazzini. Duck bill valves are a well known type of unidirectional flow component. See U.S. Pat. No. 4,473,094 to Harris; U.S. Pat. No. 4,796,795 to Urban; and U.S. Pat. No. 6,053,194 to Nelson et al.

After various components described above and associated with closure 202 (shown in so-called "exploded-view" format of FIG. 4) are assembled (FIG. 5D) and closure 202 is secured to the container 208, the other end 206 of the closure 202 is next secured to the opening of the other container 210, with the bottom of the other container 210 now positioned on a surface S (FIG. 3A), such as a countertop, and the container 208 containing the cold-brewed coffee raised above the surface S, so the upper and lower containers 208, 210 present an hourglass shape (FIG. 3A).

When a steeped batch of cold-brewed coffee and the coffee grounds are both still contained within upper container 208, the length of the tube 232 itself, or together with the duck bill valve 234 attached to the end of tube 232, can be a length extending, e.g., from about 25% to about 50% of the height (FIG. 3A) of the cold-brewed coffee and coffee grounds still contained within upper container 208.

In addition to the tube length constraint, the gravity-operating constraint of the '011 patent to Feber is also problematic. For instance, for those who prefer to use a paper filter, natural coffee oils tend to accumulate in pores of the filter paper and increase an amount of time, which depends upon variety of coffee cold brewed and concentration of a cold-brewed batch, needed to transfer cold-brewed coffee from an upper container (see FIG. 3A) through the filter and into a lower container.

Since many people using a gravity-assisted cold-brewed coffee system find an amount of time needed to filter concentrated coffee extract to be undesirable, the present subject matter—my invention—can easily filter concentrated coffee extract through a commercially available paper filter in about 90 seconds or less, depending on cold-brewed coffee variety and concentration of cold-brewed batch.

Figure 7:
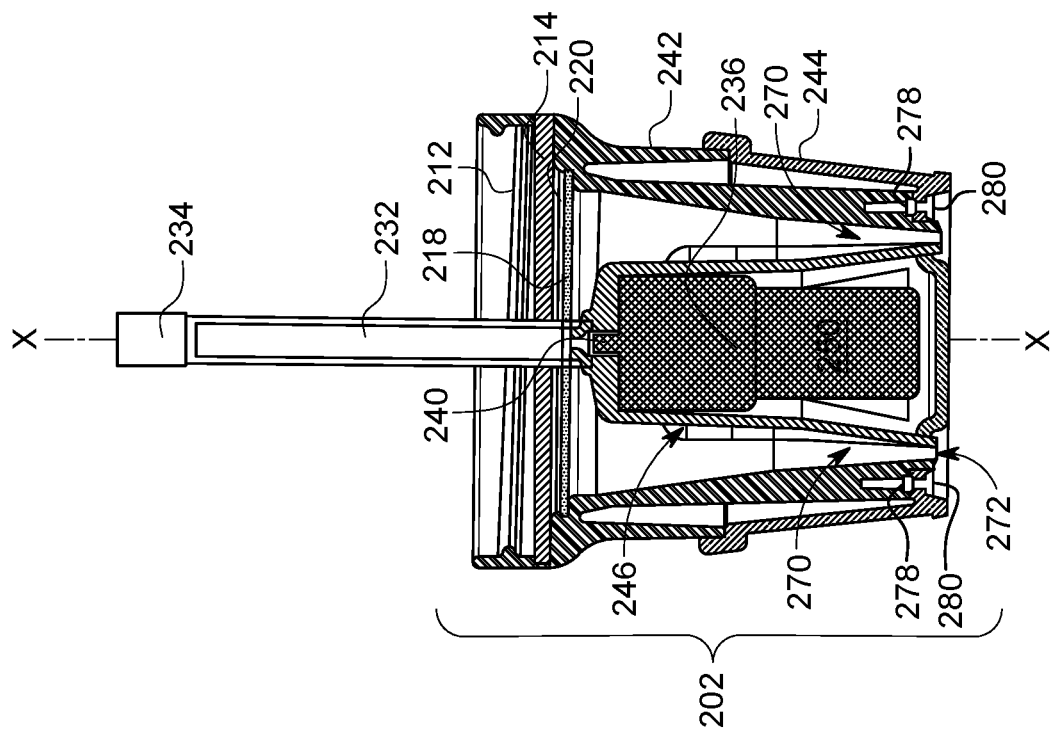
FIG. 7 is a sectional view of the closure, taken along the plane 7-7 in FIG. 4.
Figure 6:
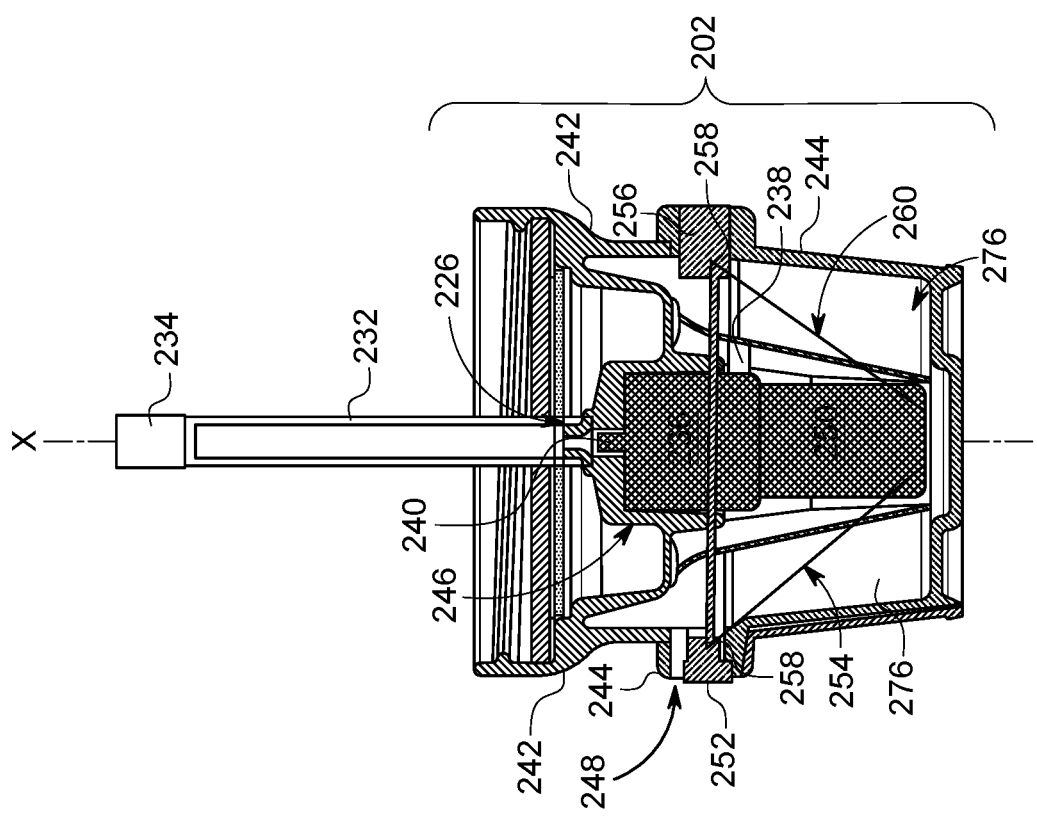
FIG. 6 is a sectional view of the closure taken along the plane 6-6 in FIG. 4.
Figure 11:
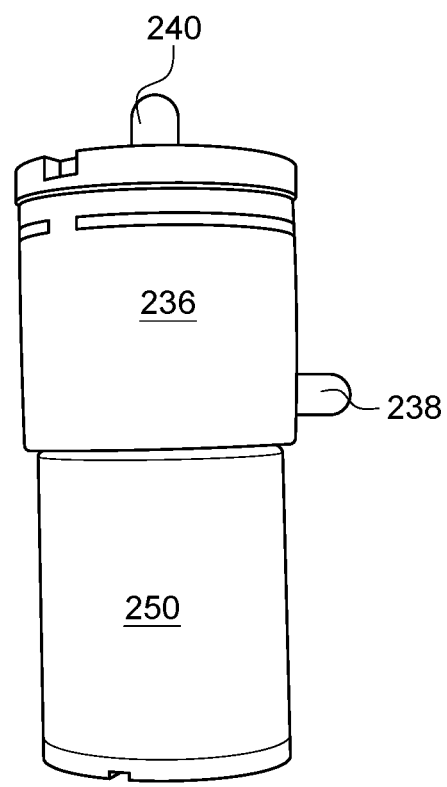
FIG. 11 is an enlarged view—relative to FIGS. 6 and 7—of a pump and motor.

The closure 202 of the present subject matter contains a pump 236 (FIG. 11) disposed within an interior region. (FIGS. 6, 7.) The pump 236 has an inlet 238 and an outlet 240. (FIGS. 6, 11.) The closure 202 includes a first housing 242 (FIGS. 6, 7) configured to removably secure the first container 208 (FIGS. 3A, 3B) to the first housing 242 and a second housing 244 (FIGS. 6, 7) configured to removably secure the second container 210 (FIG. 3A) to second housing 244. The first or upper housing 242 and the second or lower housing 244 are securely joined to form the closure 202. While the housings or "shells" 242, 244 of the illustrated embodiment are injection-molded plastic, those of ordinary skill in the present subject matter are aware of other ways of manufacturing the housings or "shells" 242, 244 such as via 3D printing. (See, e.g., U.S. Pat. No. 4,575,330 to Hull and U.S. Pat. No. 5,182,056 to Spence et al.) A sleeve 246 (FIGS. 6, 7), unitary with the first housing 242 (FIG. 6), includes an open-end portion 226 which is unitary with the sleeve 246. (The open end portion 226 of the sleeve 246 was described above in connection with FIG. 4.)

The sleeve 246 defines an interior region within which the pump 236 is received and retained. (FIGS. 6, 7.) When disposed within the inner region of the sleeve 246, the pump outlet 240, disposed with an interior cavity of the sleeve 246 (FIG. 6), is aligned with an opening 262 (FIG. 8) through the end portion 226 of the sleeve 246 which, in turn, is secured to the fluid inlet-end of the tube 232. For this embodiment of the present subject matter, the pump 236 is a so-called "micro" air pump used to draw air into the closure 202 via an air inlet 248 shown in FIG. 6.

Air introduced into the closure 202 via the air inlet 248 is provided to the inlet 238 of air pump inlet 236 by an air flow connection (not shown). A motor 250 (FIGS. 6, 7, 11), powered by a source (not shown), is operatively connected (FIG. 11) to air pump 236. In the illustrated embodiment, a female power jack 252 (FIG. 6) is operatively connected to the motor 250 via a first electrical connection 254. An on/off button 256, operatively connected to the power jack 252 via a second electrical connection 258, is also operatively connected to the motor 250 via a third electrical connection 260. A conventional 110-120 volt alternating current ("AC") to 12-volt direct current ("DC") power adapter (not shown) is plugged into jack 252.

Figure 10A:
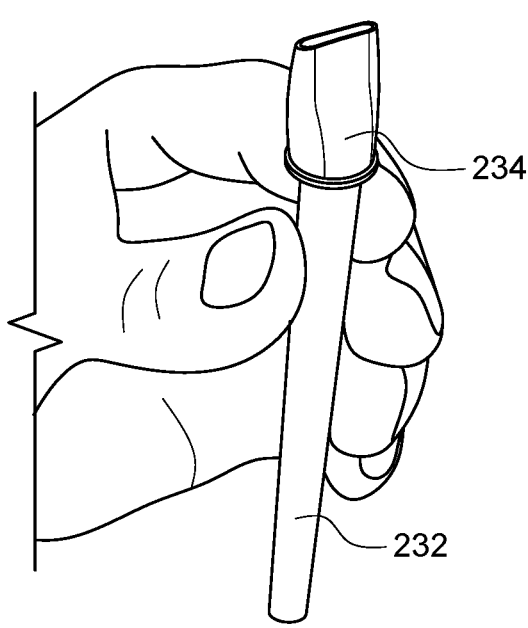
FIG. 10A shows a user holding two components associated with the closure.
Figure 10B:
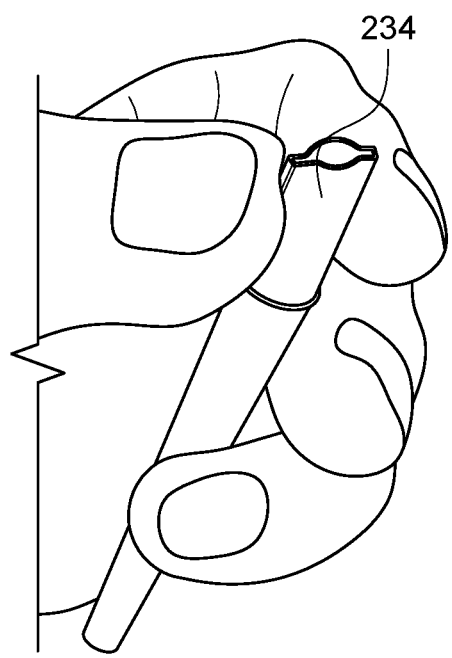
FIG. 10B depicts a closure component (shown "closed" in FIG. 10A) now open.

In operation, when a user depresses the button 256 to turn the motor 250 "on," air pump 236 provides a continuous flow of air to tube 232, via opening 262 (FIG. 8) through the open-end portion 226 of the sleeve 246, to pressurize the upper container 208. The duck bill valve 234, normally closed (FIG. 10A), is caused to open (FIG. 10B), to a degree, depending on flow of air through tube 232. The sleeve 246 and upper housing or "shell" 242 have been designed for the tube 232, pump 236, and motor 250 to be centrally located with closure 202 vertically aligned with central axis X-X (see FIGS. 6 and 7) for maximum operational efficiency. A person of ordinary skill in this field would know how to replace pump 236 and/or motor 250 with a substitute pump and motor as well as how to make a substitute housing with associated integral sleeve configured and dimensioned to snuggly receive the substituted pump and/or motor, for increasing or decreasing the time requirement mentioned above, for purposes of filtering any particular cold-brewed coffee batch.

Pressure in upper container 208 causes cold-brewed coffee to pass through filter 220 (FIGS. 4, 7) to fill the lower container 210 with filtered cold-brewed coffee (FIG. 3A). Coffee grounds from the cold-brewed coffee batch collect on filter 220.

The lower end 206 of the closure 202 has a frustoconical shape configured and sized (FIG. 3B) to fit snugly within the opening of the lower container 210. To provide fluid-tight engagement between the upper and lower containers 208 and 210, the closure 202 includes a frustoconical silicone band 264 circumferentially mounted on the exterior surface of the lower end 206 of closure 202. (FIGS. 3A, 3B.)

When the upper container 208 and lower container 210 are securely joined to the closure 202, in a vertically oriented arrangement as depicted in FIG. 3A, and the upper container 208 contains a freshly steeped batch of cold-brewed coffee to be filtered, and when a user depresses the on/off button 256, causing the air pump 236 to pressurize the upper container 208, the coffee extract in the upper container 208 is caused to flow through filter 220 and closure 202, into lower container 210.

Figure 9:
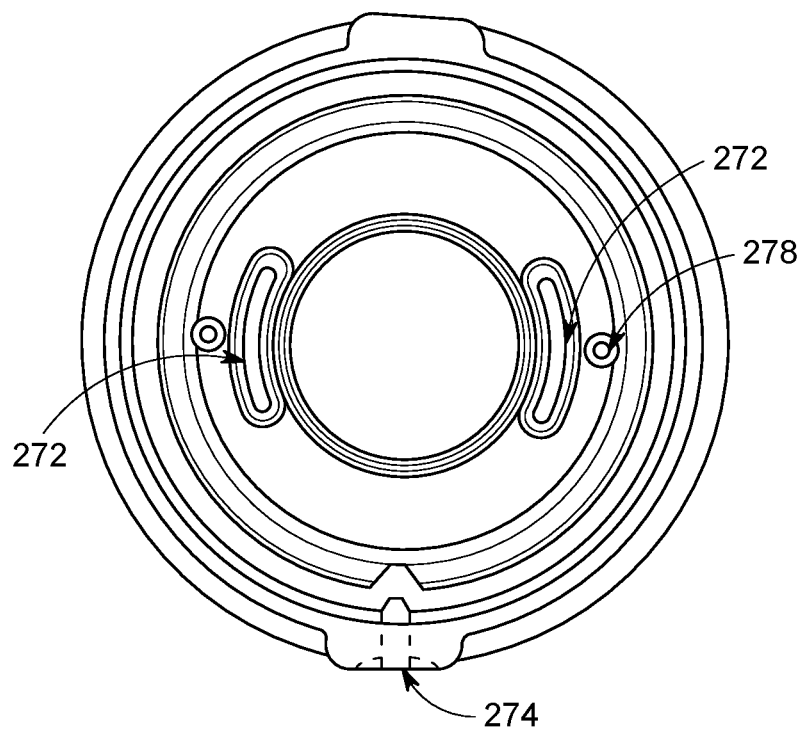
FIG. 9 is an underside view of the closure of the invention depicted in FIG. 8.

Channels 270 (FIG. 7) provided within the upper housing 242 below the filter 220 direct the filtered coffee extract through a pair of elongated exit apertures 272 (FIGS. 7-9) located at the bottom of the upper housing 242 into lower container 210. Because air contained within lower container 210 must escape container 210 as it fills, an air outflow gap 274 (FIG. 9), between the silicone band 264 (FIG. 3A) and the lower end portion 206 (FIG. 3B), enables air to exit the lower container 210 as it fills. Internal spaces 276, provided within the closure 202 (FIG. 6), communicate with the air outflow gap 274 (FIG. 9). The upper housing 242 includes an embedded pair of internally threaded bosses 278 (FIGS. 7, 9) into which fasteners 280 (FIG. 7) having external threads matching the internal treads of the bosses 278 are secured for joining the upper housing 242 and lower housing 244 of the closure 202 together.

What has been illustrated and described in this patent specification is an improved closure for a system for cold-brewing coffee. While the present subject matter has been described in reference a current embodiment, the present subject matter is not to be limited to this embodiment. On the contrary, many alternatives, changes, and/or modifications shall become apparent to those of ordinary skill in the field of the present subject matter after this patent specification has been reviewed in connection with the associated drawing figures. For instance, in other embodiments, the female power jack 252 and on/off button 256, instead of being located in the lower housing or "shell" 244 (FIG. 6), are located in the upper housing or "shell" 242 (not shown). Furthermore, in still other embodiments, instead of two channels 270 (FIG. 7) and two fluid-exit apertures 272 (FIG. 8), there could be less than two, or more than two, channels and/or fluid-exit apertures, if desired. Finally, the pump inlet 238 need not be side mounted. Therefore, all such embodiments, alternatives, changes, and/or modifications are to be viewed as part of the present subject matter insofar as they fall within the spirit and scope of appended claims.

I claim:

1. An improved cold-brewed coffee system, wherein the cold-brewed coffee system includes:
   a first container sized for containing a predetermined amount of water and for steeping a predetermined amount of ground coffee beans in the water; and
   a second container sized for collecting a resultant amount of coffee bean extract therein, wherein the second container has a fluid-inlet end portion;
wherein the improvement comprises:
   a closure consisting essentially of:
      a first housing having a fluid-inlet end portion defining internal threads, wherein the first container defines a fluid-outlet end portion having external threads that mesh with the internal threads of the first housing, whereby the fluid-inlet end portion of the first housing is removably securable to the fluid-outlet end portion of the first container;
      at least two threaded fasteners; and
      a second housing removably joinable to the first housing by said at least two threaded fasteners, wherein the second housing has a fluid-outlet end portion through which the coffee bean extract flows, wherein the fluid-outlet end portion of the second housing is removably securable to the fluid-inlet end portion of the second container, whereby, when the first container is secured to the first housing and the second container is secured to the second housing, the second container collects the resultant amount of coffee bean extract therein;
   a pump having a pump inlet and a pump outlet;
   a sleeve unitary with the first housing, wherein the sleeve defines an interior region into which the pump is received and an exterior surface extension in fluid communication with the pump outlet; and
   a tube having opposite end portions, wherein one of the opposite end portions of the tube is removably securable to the exterior surface extension of the sleeve.

2. The improved cold-brewed coffee system of claim 1, further including a motor operatively connected to the pump and a unidirectional flow valve disposed within the first container and removably securable to the other one of the opposite end portions of the tube, wherein the unidirectional flow valve is adapted and configured to restrict fluid flow from the first container to the pump, and wherein the pump when operative by the motor causes transfer of fluid from the first container and through the closure.

3. The improved cold-brewed coffee system of claim 2, wherein the pump is an air pump.

4. The improved cold-brewed coffee system of claim 3, wherein operation of the motor causes the air pump to draw air into the pump inlet and discharge air from the pump outlet.

5. The improved cold-brewed coffee system of claim 4, wherein the closure is open to atmosphere for enabling atmospheric air to be drawn through the closure and into the air pump inlet during operation of the air pump.

6. The improved cold-brewed coffee system of claim 2, further including a filter disposed in the first housing, wherein the filter is configured to be effective for passing coffee bean extract yet preventing coffee grounds to pass therethrough.

7. The improved cold-brewed coffee system of claim 6, further including a screen disposed within the first housing, wherein the screen supports the filter.

* * * * *